Nov. 15, 1955  P. F. MARSHALL  2,723,742
MACHINE FOR SPACING SMALL ARTICLES
Filed June 14, 1954
2 Sheets-Sheet 1
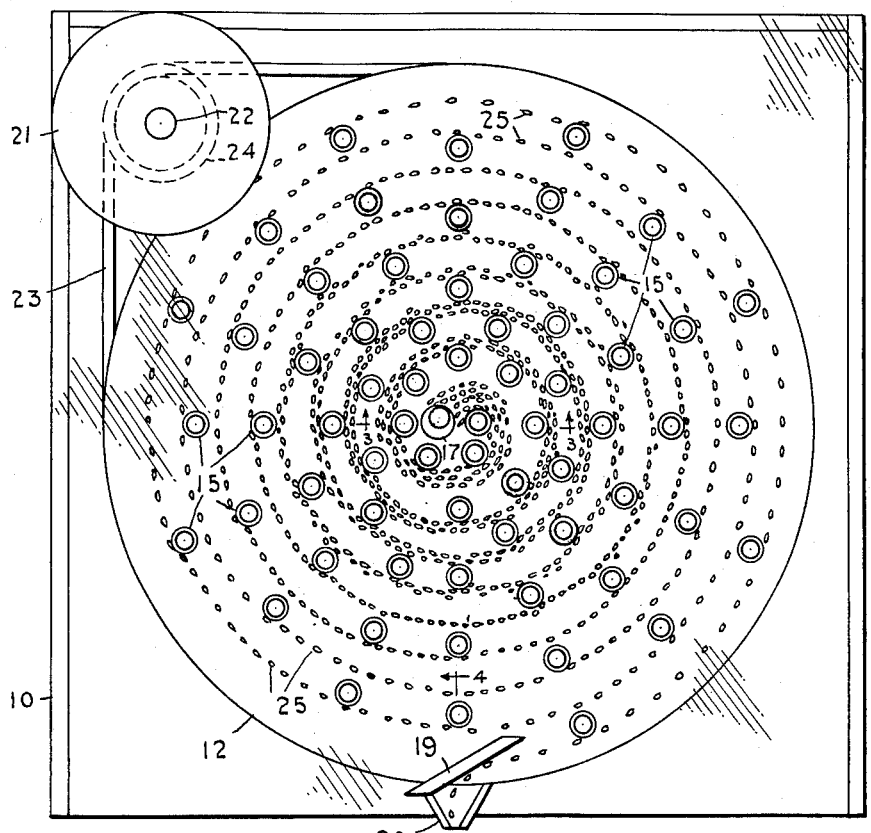
FIG. 1.
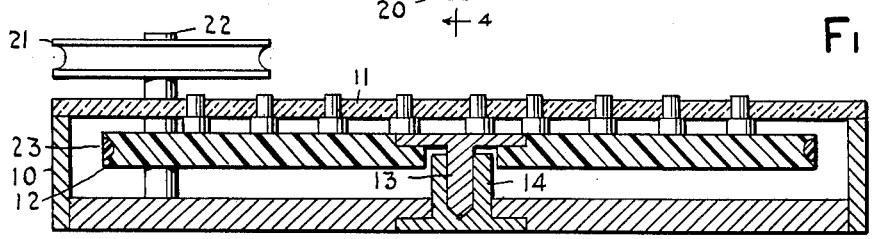
FIG. 2.
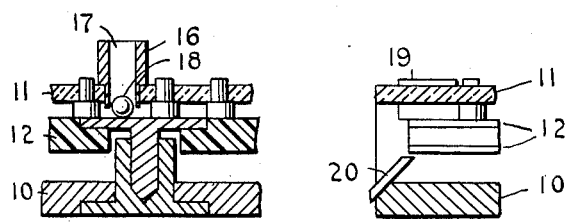
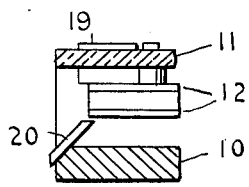
FIG. 3.     FIG. 4.
INVENTOR.
PRESTON F. MARSHALL
BY
*Holcombe, Wetherill & Brisebois*
HIS ATTORNEYS.

United States Patent Office

2,723,742
Patented Nov. 15, 1955

2,723,742

MACHINE FOR SPACING SMALL ARTICLES

Preston F. Marshall, Chevy Chase, D. C.

Application June 14, 1954, Serial No. 436,543

5 Claims. (Cl. 198—30)

The present invention relates to a machine for dispensing articles and more particularly to dispensing small articles at an even rate.

Heretofore, considerable difficulty has been encountered in dispensing small articles at an even rate and this difficulty increases when the articles to be dispensed are elongated, or of uneven cross section or are not uniform in dimensions.

This dispensing problem is particularly acute in the field of agriculture were it is desired to evenly space small non-spherical seeds in rows.

At present agricultural planting machines for row planting are equipped with dispensers, usually referred to as hoppers, the purpose of which is to feed tthe seed at an even rate to the working head which may be of disk, drill, or runner type. This working head opens the ground to allow the seed to be inserted therein. Usually these hoppers work on the principle of allowing seed to become lodged in one of a series of openings in a moving part and then evacuate these openings in sequence into the exit tube from the hopper. Examples of this type of hopper could include the International Harvester Company's McCormick No. 40 and No. 60 Beet and Bean Planters which use as openings to trap the seeds a series of indentations or circular holes located at or near the edge of a circular plate rotating about a vertical axis with the seeds resting upon that plate by their own weight. Other examples would be the John Deere Company's John Deere-Van Brunt Model B or Model RB Grain Drills. In these examples the seeds are trapped by indentations in a rotating horizontal disk or rotating cylinder with its axis horizontal to the ground.

In practice the hoppers now in use the quite adequate for large seeds of regular shape but are inadequate for most small seeds and particularly small seeds that are non-spherical in shape. The inadequacy of these machines appears to stem from the inherent geometric difficulty involved in constructing an indentation or opening on the rotating member that will allow one, and only one, seed to lodge in an opening when the seed is other than spherical. As a result of this geometrical difficulty the indentation or holes in the rotating member are usually made excessively large and then some device is added to force surplus seeds out of the member when they jam from overfilling. This solution of using excess size in the indenture or hole results in seeds being fed at a rate of more than one seed per indentation. The net effect is to deliver the seeds not in single file sequence but in a sequence of packets each packet containing from one to five seeds. This uneven delivery is somewhat alleviated and evened out by the random bouncing the seeds suffer on their travel down the feed tube connecting the hopper and the working head. Regardless of this random scattering the seeds receive in the feed tube the operation is still less than satisfactory for good row crops because the resulting unevenness of planting produces crowding, and bare spots. In some cases the farmer is induced to overplant and then correct the overplanting with thinning. The overplanting causes an appreciable waste of money in seeds but more important is the ever increasing costs of thinning. In some truck crops the recent comercial availability of seed with a high germination rate could, if coupled with more even planting, greatly reduce, or even eliminate the need to thin.

The present invention aims to provide a hopper which is capable of dispensing seeds of any shape in consecutive, evenly-spaced, order at a predetermined rate of feed.

A further object is to provide an improved seed dispensing mechanism for use with packaging and other types of machines including such as disclosed in my Patent No. 2,601,620.

Another object is to provide a seed dispensing mechanism that is extremely simple in design, economical in construction, free of maintenance problems, and capable of withstanding the effects of weather both in and out of doors.

Another object is to provide a dispensing mechanism that is suitable for use in manufacturing industries wherever the delivery of small articles at a uniform rate is desired.

Another object is to provide a dispensing machine that is adaptable for use in manufacturing industries wherever the delivery of a powder, aggregate, sand or similar material at a uniform rate of feed is desired.

Another object is to provide a dispensing mechanism that is suitable for supplying more than one outlet from a common supply.

Other objects and advantages of the invention will appear hereinafter and what constitutes the invention is set forth in the appended claims.

A preferred embodiment of the invention has been chosen for purposes of illustration and description.

Fig. 1 is a plan view of the hopper with the input feed tube removed.

Fig. 2 is a front vertical sectional view taken through the centerline of Fig. 1.

Fig. 3 is a front vertical section view taken on the line 3—3 in Fig. 1 through the center line of the input feed tube with all parts of the machine that are not related to the feed tube broken away.

Fig. 4 is a side elevation, partly in section, of the output feed tube and related parts.

Figure 5:
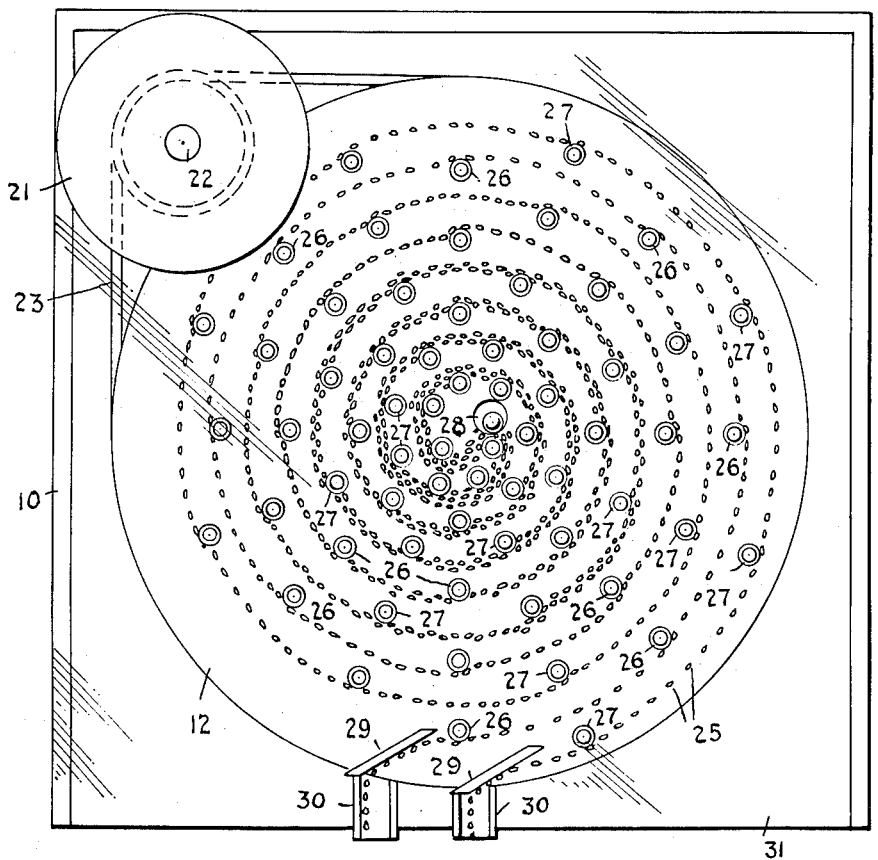
Fig. 5 is a plan view of a modified form of the invention having double spiral arrangement of guide pins for feeding two seeds at a time from the hopper.

In order to illustrate this invention it has been shown as comprising three main parts; an open end square exterior supporting cabinet 10, the top 11 of which is constructed of a transparent material, rotating disk 12 supported within the cabinet on shaft 13 and bearing 14, and a series of guide pins 15 held loosely in holes in the top plate and resting by their own weight on the rotating disk. These guide pins are arranged about the axis of rotations of the rotating disk substantially in the form of a spiral.

In addition to these three main parts there is an input feed tube 16 and an entrance hole 17 for the input of seeds, a spherical or cylindrical agitator 18 to assure free flow of seeds in the seed input tube, an ejector plate 19 to force the seeds from the rotating disk, and an output feed tube 20 to deliver the seeds from the hopper.

To produce the rotation of the disk 12 a pulley 21 driven by an exterior source of power rotates shaft 22 which rotates the disk by virtue of an interconnecting driving belt 23 running around a grooved pulley 24 and an encircling groove in the edge of the disk 12.

For illustrative purposes only, the hopper shown is for dispensing agricultural seeds. The disk 12, made of any rigid material as for instance hard rubber, is rotated at any speed below the critical speed at which the seeds 25 resting anywhere on the disk would be moved outward toward the periphery of the disk by centrifugal force. The series of stationary pins 15, arranged substantially in the form of a spiral and resting lightly on the rotating disk 12, deflects the seeds outward from the central portion of the disk towards its periphery. Any one seed will be progressively forced by the series of pins to follow the spiral path from a point near the center of the disk to its periphery. As the seeds move outwardly on the disk their speed is increased by virtue of being moved to a point on a circle having a greater radius from the center of a disk rotating at a constant angular velocity. By viewing the movement of seeds as a constant flow of a stream of seeds, it is apparent that, since the flow of seeds near the center of the disk is relatively slow while the flow near the periphery is relatively fast, the stream of seeds is progressively stretched out and by virtue of this stretching is reduced in cross section. It is apparent that by proper selection of dimensions, it is possible to feed a stream of seeds numbering many seeds abreast into the spiral and receive the seeds out of the spiral in single file.

The operation of the dispenser is based on two principles. First, the gravity flow of seeds through a restricted opening on to a moving surface which, even with agitation must be maintained at a high enough rate to allow the diameter of the restricted opening to be several times the longest dimension of an individual seed. A diameter of less dimension will induce jamming. Under these conditions it is obvious that gravity feed must be limited to producing a stream or flow of seeds averaging several seeds in cross section. In practice a cross section of three to five seeds is necessary.

The second principle is that if this minimum flow of seeds is placed on some interior arc of a rotating disk and then gradually worked out to some exterior arc on the disk the average number of seeds in the cross section will be reduced in proportion to the ratio of the radius of the larger arc to the radius of the smaller arc. The dispenser of this invention accomplishes the operation of working the seeds out to the larger arc by deflecting the seeds outward with a series of pins arranged in a spiral path about the center of rotation of the disk. It is noted that the same effect could be obtained by substitution of a spiral strip in place of the pins. The pins are preferred because the seeds have less tendency to jam with a non-continuous surface restraining them and because mechanically the floating pins have the advantage of following the disk intimately even after the plate suffers some bending or warping.

The above description of a single input, single output and single spiral path for the seeds is not intended to limit the invention to preclude the use of a plurality of parallel paths arranged in spiral form. Such an arrangement would produce a plurality of outputs and could, if desired, use a single input or a plurality of inputs. This modification is shown in Figure 5 using two paths of pins 26, 27 arranged in two concentric spirals extending from the input 28 each to its own deflector plate 29 and output tube 30, the pins being held loosely in holes in the transparent top plate 31 of the cabinet 10, the construction of which otherwise is like that shown in Figure 4.

I am aware that others have used a spiral path in a dispensing unit but I am not aware of any such unit wherein the spiral performs the same function as in my invention.

The dimensions of the spiral in my invention are such as to produce a small enough concentration of articles at the output to suit the purpose at hand, usually the feeding of the articles one or two at a time, and I find that normally the concentration at the output of the device bears the same relationship to the concentration of articles at the input as the radius of the spiral at the input does to the radius at the output. Accordingly, in constructing the spiral, I selected dimensions that give about the same ratio between the radius of the spiral at output and input as the number of seeds abreast at the input bears to the number of seeds abreast desired at the output.

I claim the following as my invention:

1. A loose article dispensing device for agricultural seeds and the like comprising a circular supporting disk mounted for rotation upon a vertical axis, means for feeding loose articles on to said disk near its center, means for rotating said disk at a speed insufficient to cause said articles to slip off of its outer edge from centrifugal action, a series of deflectors spaced in a spiral row extending from near the center of said disk to near its outer edge, and deflector-carrying means positioned above the disk in which said deflectors are slidably mounted for vertical movement with their lower ends resting on said disk, each deflector being radially spaced outwards with respect to its predecessor in the row a distance less than the radial width of the deflecting portion thereof, whereby said articles are strung out in an elongating and thinning spiral line as they approach the outer edge of said disk.

2. A loose article dispensing device as set forth in claim 1 having an article engaging discharge member at the end of said spiral row.

3. A loose article dispensing device as set forth in claim 1 having a discharge outlet positioned at the edge of said disk near the end of said spiral row.

4. The method of dispensing loose articles of the nature of agricultural seeds which consists in feeding them a number at a time to a slowly rotating horizontal surface at a point eccentrically located with respect to its center of rotation, engaging said circularly moving articles on their inner sides so as to urge them outwardly in an expanding spiral curve and cause them to spread apart lengthwise along said curve while retained on said surface by friction, and removing said articles one by one as they pass a point radially removed from the center of rotation of said surface, the ratio between the distances from said last named point and from the eccentric feeding point respectively to the center of rotation being at least as great as the number of articles fed simultaneously to said feeding point, and the speed of rotation of said surface being insufficient to cause said articles to be displaced outwardly by centrifugal force.

5. A loose article dispensing device consisting of a substantially flat supporting disk mounted for rotation about a vertical axis, fixed mounting means holding stationary article deflecting means over and in sliding contact with said supporting disk, said article deflecting means extending spirally outward from a point near the center of said disk to a point near its outer edge, means for feeding loose articles onto said disk at a point outside the inner end of said article deflecting means, and means for rotating said disk at a speed insufficient to cause the articles fed onto said disk to be displaced outwardly by centrifugal force.

References Cited in the file of this patent

UNITED STATES PATENTS

| | | |
|---|---|---|
| 2,585,559 | Lakso | Feb. 12, 1952 |
| 2,594,337 | Noe | Apr. 29, 1952 |